Dec. 30, 1969 M. C. SELBY 3,487,305
ELECTROTHERMIC INSTRUMENTS FOR MEASURING VOLTAGE OR CURRENT
Filed Aug. 4, 1967 6 Sheets-Sheet 1

INVENTOR
Myron C. Selby
BY
ATTORNEY

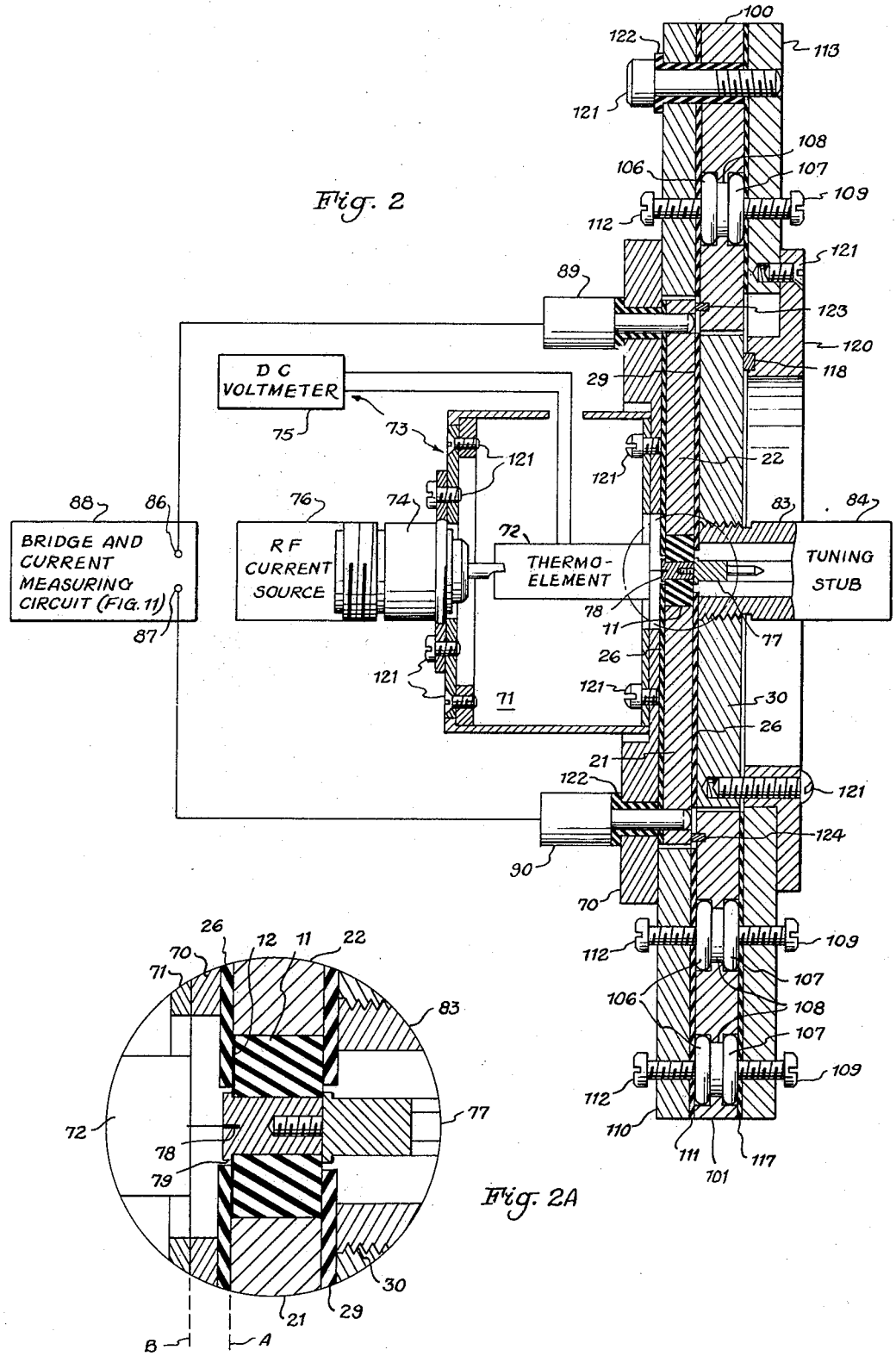

Dec. 30, 1969       M. C. SELBY       3,487,305
ELECTROTHERMIC INSTRUMENTS FOR MEASURING VOLTAGE OR CURRENT
Filed Aug. 4, 1967       6 Sheets-Sheet 3

SECTION A-A

PLAN

ELEVATION

United States Patent Office 3,487,305
Patented Dec. 30, 1969

3,487,305
ELECTROTHERMIC INSTRUMENTS FOR MEASURING VOLTAGE OR CURRENT
Myron Carl Selby, Boulder, Colo., assignor to the United States of America as represented by the Secretary of Commerce
Filed Aug. 4, 1967, Ser. No. 658,984
Int. Cl. G01r 23/04
U.S. Cl. 324—95                    10 Claims

ABSTRACT OF THE DISCLOSURE

The outer conductor of a coaxial assembly includes an annular split plate positioned between and insulated from a pair of outer annular plates. Two electrothermic elements are located transverse the longitudinal axis of the coaxial assembly, each between the center conductor and a respective section of the split plate. The elements are in series with a DC or low frequency biasing source. In a voltage calibrating instrument, the device to be calibrated is positioned across the center conductor and one of the outer plates (port $x$) and an RF source is positioned across the center conductor and the other outer plate (port $y$). In a current calibrating instrument, an RF source is connected in series with a current indicating device which is connected to port $x$, while a high impedance device is connected to port $y$.

BACKGROUND OF THE INVENTION

This invention relates to instruments for measuring the magnitude of voltage or current and in particular to such instruments employing electrothermic elements.

An electrothermic element is defined as an electrical device which depends for its operation on the heating effect of a current. Examples are the thermocouple and bolometer.

One arrangement in the prior art for measuring sinusoidal voltages at frequencies up to 1 gHz. has two thermistors positioned in one arm of an equal-arm bridge. RF energy is applied in parallel to the thermistors through DC blocking capacitors. An RF switch is located between the RF generator and the thermistors, and a DC potential source and a variable resistor are connected in series across two other arms of the bridge. The bridge is first balanced with the switch open and then rebalanced with the switch closed when some of the DC power in the thermistors is replaced by RF power. Under these conditions the RF voltage across the thermistors may be calculated from the values of the voltage provided by the DC source and the values of the DC voltages appearing across the variable resistor when the switch is open and closed. This arrangement was incorporated in a standard developed by the National Bureau of Standards, which has a frequency range of 1 to 1000 mHz., a voltage range of about 20 mv. to 1.5 v. and an approximate range of accuracies of 0.3 to 2 percent. The arrangement is described in detail in "A Bolometer Bridge for Standardizing Radio-Frequency Voltmeters" by Myron C. Selby and Lewis F. Behrent, published in the NBS Journal of Research, vol. 44, pp. 15–30, (January 1950).

An electrodynamic ammeter in the prior art is used in the measurement of very high frequency current. The ammeter comprises a coaxial transmission line and a short-circuited ring between the inner and outer conductors of the line. The ring is suspended from a central tower by a quartz fiber. When current is flowing in the line a torque, which is a function of the current magnitude, is produced on the ring; the magnitude of the torque is indicated by light reflected from a mirror on the quartz-fiber suspension. The current standard, developed by NBS, using this ammeter has a frequency range of about 1 to 1000 mHz., a current range of about 0.5 to 100 amperes, and a range of accuracies of 0.3 to 1 percent.

The instruments described below find application in both voltage and current standardization and have considerably wider upper frequency and dynamic ranges at accuracies equal to and potential exceeding those above.

SUMMARY OF THE INVENTION

The outer conductor of a coaxial assembly includes a split or composite inner annular plate positioned between and insulated from two outer annular plates. The inner plate comprises two sections. A pair of electrothermic elements are positioned transverse the longitudinal axis of the center conductor. Each element is connected between the center conductor and a respective section of the inner plate. By definition, port $x$ includes the center conductor and the outer plate closest the elements, while port $y$ includes the center conductor and the other outer plate.

In one embodiment of an instrument for calibrating voltages the electrothermic elements are formed of bolometric film and are connected in series with a source of DC biasing potential. The device to be calibrated is connected to port $x$ and a variable RF potential source is connected to port $y$. In this way the two film elements are tied in series for the DC biasing energy and in parallel for the RF energy. The biasing energy is isolated from the RF energy by means of two sets of capacitors. Each capacitor comprises an outer plate, a section of the inner plate and the dielectric material insulating these plate-elements. The reference plane where the standardizing voltage appears is located essentially at the input plane of the device being calibrated so that the distance between the two planes is in the thickness of the dielectric forming the capacitors which in this embodiment is of the order of two mils.

In an embodiment of an instrument for calibrating current, two bolometric film-elements are in series with a DC biasing potential. An RF current source is connected in series with a current indicating device which is connected to port $x$, while a relatively high input impedance device is connected to port $y$. As in the voltage calibrating instrument the films are in series for the DC biasing energy and in parallel for the RF energy, and the plane through which the RF standardizing current flows is located essentially at the output plane of the current indicating device.

The operation of the voltage and current calibrating instruments is set forth in detail below.

BRIEF DESCRIPTION OF THE DRAWINGS

Reference is now made to the drawings wherein like designating numerals indicate like parts throughout the figures thereof and wherein:

FIG. 2 is an instrument that may be used in making current measurements;

FIG. 2A is an enlarged representation of the portion of FIG. 2 enclosed in a circle;

DESCRIPTION OF THE PREFERRED EMBODIMENTS

Structure

Figure 3:
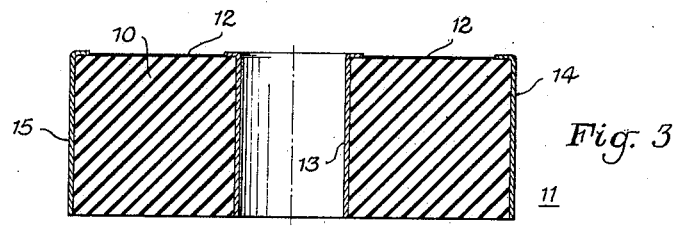
FIG. 3 is a section along line A—A of the bolometer ring in FIG. 4.
Figure 4:
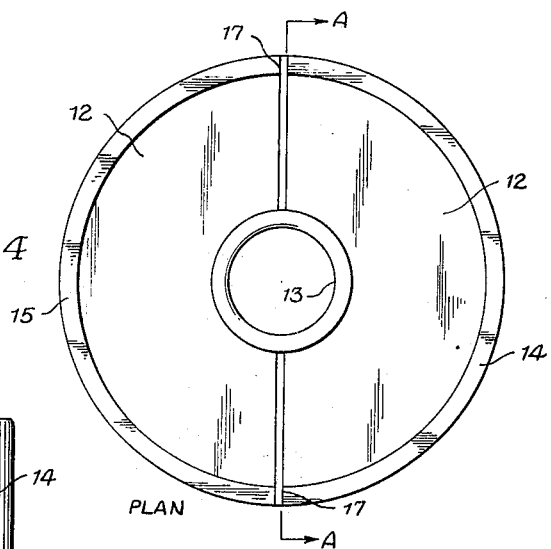
FIG. 4 is the plan view of a bolometer ring in FIGS. 1 and 2.
Figure 5:
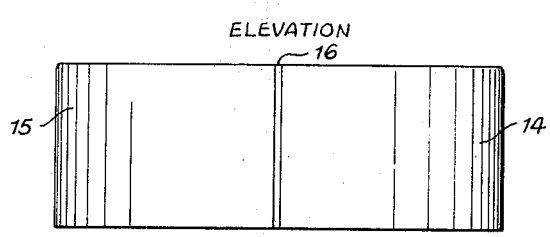
FIG. 5 is an elevation of the bolometer ring in FIG. 4.

With reference to FIGS. 3 to 5, substrate 10 of annular bolometer disk 11 may be fabricated of any suitable insulating material such as quartz or high temperature-conducting ceramic (to allow higher current carrying capacity for thin conductive bolometric film 12). Electrodes 13, 14 and 15 are fired or evaporated on the cylindrical surfaces of substrate 10 and at their rims as shown in FIGS. 3 and 4 to make sure of good contact with the pins and outer conductors described below. The electrodes may be positioned only on the cylindrical surfaces of substrate 10 when good contact to the outer conductors is obtained with these alone. Insulating gap 16 separates biasing electrodes 14 and 15 (FIG. 5); a similar gap separates the electrodes on the surface of substrate 10 opposite 16.

Figure 1:
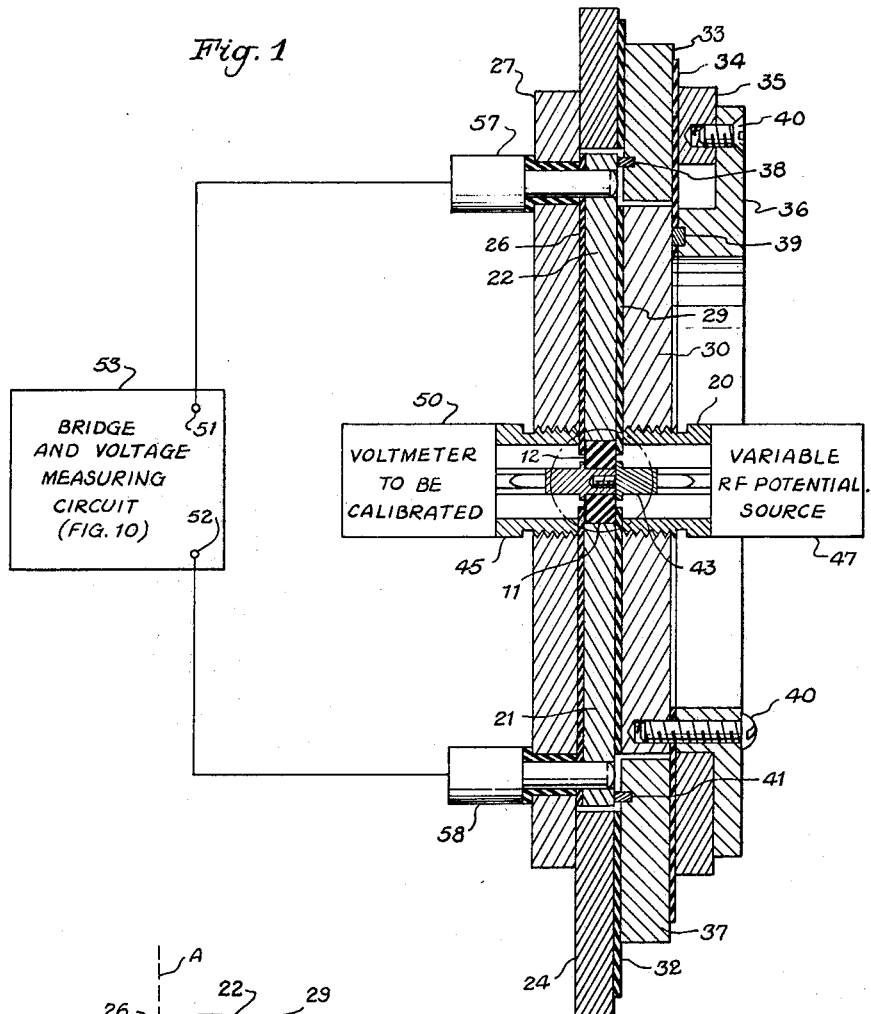
FIG. 1 is an instrument that may be used in making voltage measurements.

One of the annular surfaces of substrate 10 contains an annular area that is divided substantially in half by radial gps 17. The film is deposited on each half of the annular area and may be made of noble metals, chromium, or carbon, etc. The diameter of the annular area is substantially equal to the diameters of the coaxial conductors, e.g., to the diameter of coaxial connector 45 (FIG. 1). This reduces to a minimum step discontinuities in the coaxial system.

When the thickness of film 12 is thinner than about one-third of the skin penetration into the film at the maximum frequency of interest, the film is essentially resistive for both RF and DC currents.

When disk 11 is positioned in the coaxial assembly the resulting configuration can be treated as a composite of three cascade transmission line sections of uniform diameters and infinite-conductivity conductors and can be analyzed by well-known techniques to show that for wavelengths large compared to the transverse dimensions of the lines only the TEM or principal modes exists, and the voltage function at the interfaces of the line sections are continuous. This means that there are no longitudinal components of the electric and magnetic fields along the line and the presence of the disk does not introduce capacitive or inductive components into the system (except those of its intrinsic characteristic impedance).

Figure 8:
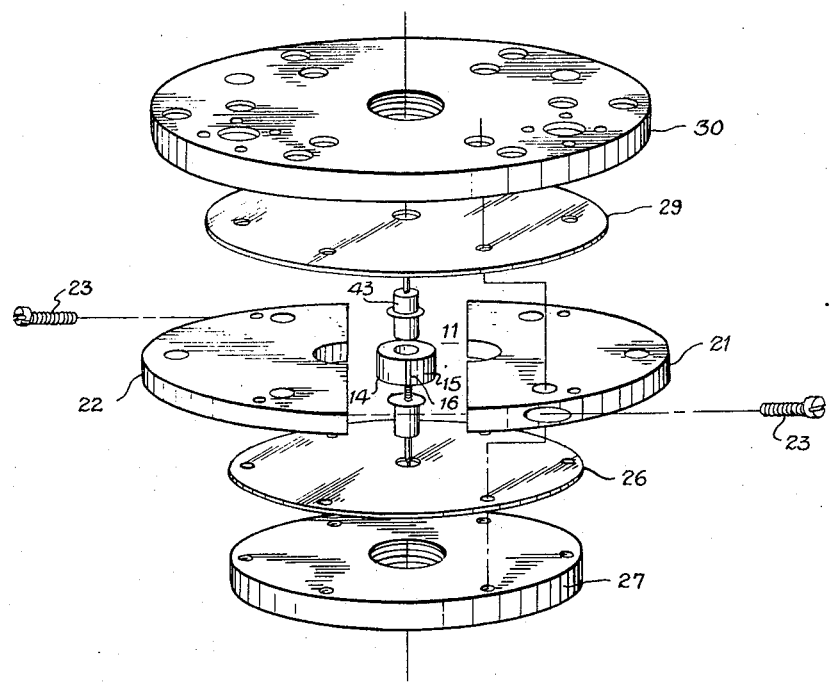
FIG. 8 is an exploded view of the core surrounding the bolometer ring in FIG. 1.

As illustrated in FIGS. 1 and 2 and shown in detail in FIG. 8, the disk 11 is clamped and soldered or cemented by means of conductive cement, e.g., silver epoxy, between the half-plates 21 and 22 which form an extension of biasing electrodes 14 and 15. The clamping is accomplished by means of insulated bolts 23 (FIG. 8) in such a way that there is an insulating gap between 21 and 22. Plates 21 and 22 may be held together by other means, e.g., by cementing the two with insulating compounds.

Figure 10:
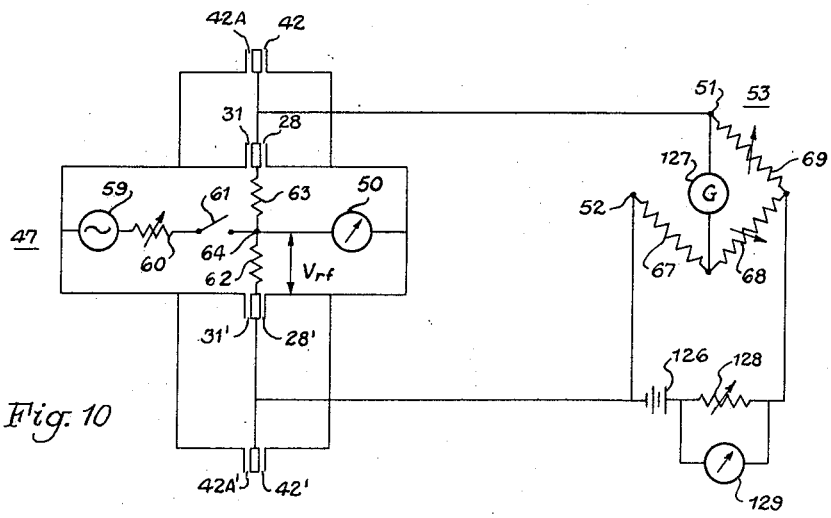
FIG. 10 is an equivalent circuit of one part and a circuit diagram of another part of the instrument in FIG. 1.

The insulation plate 29 is positioned between outer annular conductive plate 30 and conductive half-plates 21, 22 to form the dielectric of capacitors 28 and 28' (FIG. 10). Likewise insulation plate 26, positioned between outer annular conductive plate 27 and the half-plates, forms the dielectric of capacitors 31 and 31'.

The half-plates 33 and 37 are separated from each other by an insulating gap (not shown). Plate 30 is located in but spaced from the half-plates 33 and 37 to provide an insulating gap between the plate and 33, 37 as shown in FIG. 1. Similarly, the composite annular plate formed by 21 and 22 is located in and is spaced from ring 24 to obtain an insulating gap between plate and ring.

Conductive ring 24, insulation plate 32, and conductive half-plates 33, 37 form capacitors 42, 42' (FIG. 10), while the half-plates, insulation plate 34, and conductive ring 35 form capacitors 42A and 42A'.

Contact half-ring 38 is found between plates 22 and 33, contact half-ring 41 between 21 and 37 and contact ring 39 between plate 30 and ring 36. The half-rings 38, 41, and ring 39 are fabricated of RF braid.

The various plates and rings in FIG. 1 are attached together by means of properly positioned screws which are illustrated by screws 40.

It will be understood from the description below that rings 24, 35 and half-rings 33, 37 in FIG. 1 may be replaced with the ring-shaped capacitor in FIG. 2 that includes rings 110, 113, half-rings 100, 101, and mica capacitors 106 and 107. When the replacement is made the resulting instrument may be used with or without the capacitors, as desired.

Figure 1A:
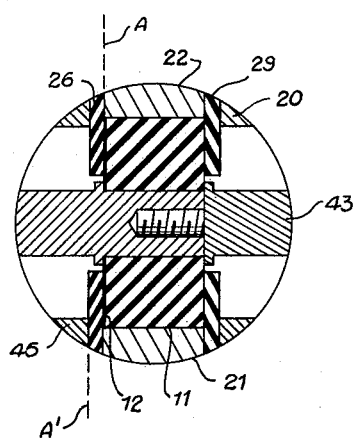
FIG. 1A is an enlarged representation of the portion of FIG. 1 enclosed in a circle.
Figure 6:
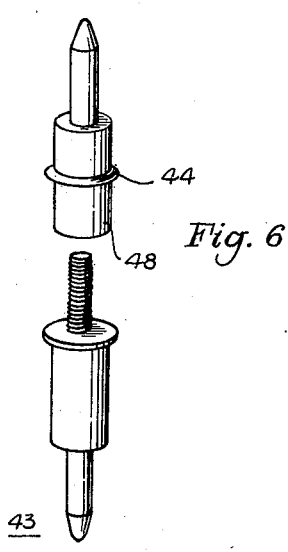
FIG. 6 is an exploded view of the voltage pin in FIG. 1.

An exploded view of voltage pin 43 is illustrated in FIG. 6. When the pin is assembled with bolometer disk 11 (FIG. 1A) flange 44 engages the flange on electrode 13 (FIG. 3) and bushing 48 is in contact with the portion of 13 on the surface surrounding the hole in the disk. One male element on the pin mates with the female element on coaxial connector 20 (FIG. 1) and the other male element mates with the female element on coaxial connector 45. The outer conductor of connector 20 engages plate 30, while the outer conductor of connector 45 engages plate 27. Connector 45 is part of the input circuit of voltmeter 50, while connector 20 is part of the output circuit of variable RF source 47. Thus some of the power provided by 47 appears in plane A (FIG. 1A) as a standardizing voltage and the input plane of voltmeter 50 is in plane A', which in this embodiment is two mils away from A. It is desirable to keep the distance between the planes to a minimum in order to reduce the errors resulting from standing waves. The voltmeter 50 may have an input voltage standing wave ratio of 200 to 1 at 1 gHz. In the worst case of an infinite standing wave ratio the possible error for 2 mils separation between A and A' will be approximately 0.01% at 10 gHz. and 0.02% at 20 gHz.

A DC voltage is derived from terminals 51, 52 in bridge and voltage measuring circuit 53; and a biasing current flows throough connector 57, half-plate 22, electrode 14 (FIG. 4), one-half of film 12, electrode 13, pin 43, the other half of film 12, half-plate 21 and connector 58. In this way, the two halves of film 12 are connected in series for DC biasing current.

In FIG. 10 source 47 is represented by RF potential source 59, variable resistor 60 and switch 61; the two halves of bolometric film 12 are represented by resistors 62 and 63. When switch 61 is closed, RF current flows through point 64 (which illustrates pin 43) in parallel through resistors 62 and 63. Thus the two halves of film 12 are connected in parallel for RF current. In this embodiment resistances 62 and 63 are substantially equal in value and the sum of the resistances is equal to the resistance of 67. Variable resistors 68 and 69 have the same value. This forms a symmetrical bridge.

In FIG. 2, which shows an arrangement used for current standardization, current indicating device 73 comprises enclosure 71, thermoelement 72, coaxial connector 74 and DC voltmeter 75. Annular plate 70 is constructed to accommodate the enclosure, and the output of RF current source 76 is applied through connector 74 to the thermoelement.

Figure 7:
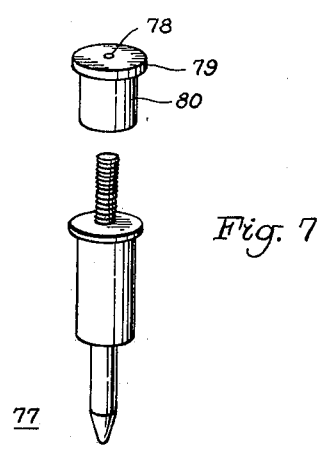
FIG. 7 is an exploded view of the current pin in FIG. 2.

An exploded view of current pin 77 is shown in FIG. 7. The pin is positioned in bolometer ring 11 and thermoelement 72 is connected to terminal 78 in the pin (FIGS. 2 and 2A). Bushing 80 on the pin engages electrode 13 on ring 11 (FIG. 3) and flange 79 engages the flange on this electrode. The male portion of the pin mates with the female element on coaxial connector 83.

Coaxial connector 83 comprises the input to tuning stub 84 which is tuned to form an effective one-quarter wavelength input impedance. Instead of the tuning stub one may use in some cases an adjustable shorting line, a low-capacity shielding cap, or a tuned LC tank to terminate the output of the coaxial system in a high impedance.

The DC biasing current is derived from terminals 86 and 87 in bridge and current measuring circuit 88 and is fed through a series circuit that includes connector 89, half-plate 22, electrode 14 (FIG. 4), one-half of film 12, electrode 13, current pin 77, the other half of film 12, electrode 15, half-plate 21, and connector 90.

The RF standardizing current flows from source 76 through connector 74 and thermoelement 72 to pin 77. The current then branches through each half of film 12 and returns through the walls of housing 71 and the outer conductor of connector 74 to the source. (One branch includes half-plate 21 and the other includes half-plate 22.) In this way the RF current crosses plane A (FIG. 2A) where film 12 is located.

The output plane B of the current indicating device 73 is shown in FIG. 2A. The distance between A and B is the thickness of plate 70 and insulation 26, which in this embodiment is of the order of 30 mils. Some thermoelements may be used up to a frequency of about 1500 mHz., and at these frequencies the distance between A and B will introduce negligible error as a result of current standing waves. If other types of current indicating devices are used the distance between A and B can be reduced to the thickness of insulation plate 26 by a suitable modification that would eliminate plate 70.

Figure 11:
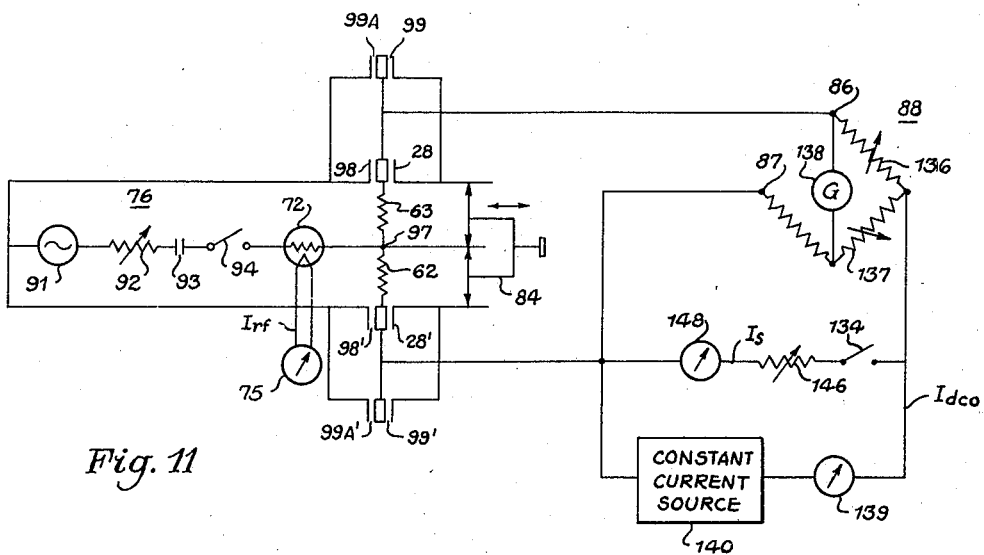
FIG. 11 is an equivalent circuit of one part and a circuit diagram of another part of the insrtument in FIG. 2.

With reference to FIG. 11, capacitor 98 is formed by outer plate 70, insulation plate 26 and half-plate 22, while capacitor 98′ is formed by 70, 26, and half-plate 21. Current source 76 is represented as RF generator 91, variable resistor 92, capacitor 93, and coaxial switch 94. When the switch is closed current flows through thermoelement 72, point 97 (which represents pin 77) and in parallel through resistors 62, 63 which illustrate the two halves of film 12.

Figure 9:
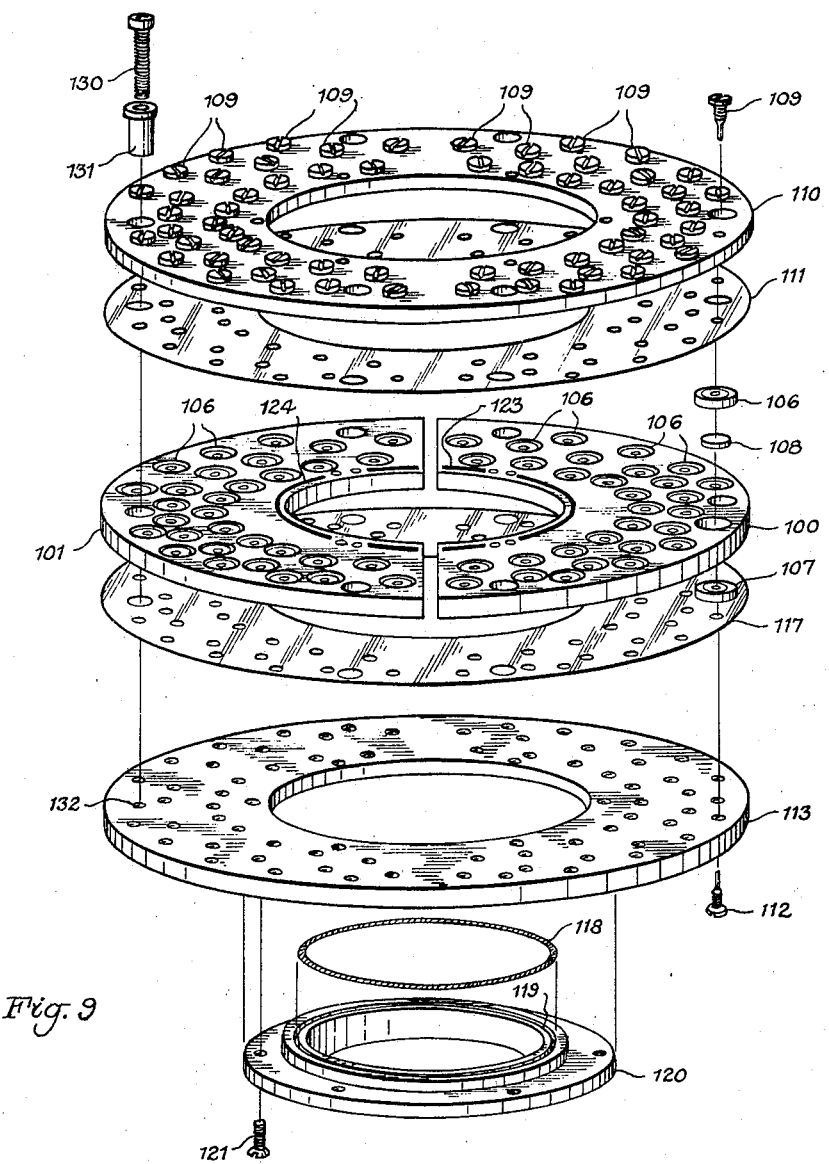
FIG. 9 is an exploded view of the ring-type capacitor shown in FIG. 2.

To keep the effective impedance of the capacitors in FIGS. 2 and 11 at a value sufficiently low so that the RF voltage drop across them does not introduce serious errors, particularly at low frequencies, an additional ring-shaped capacitor is provided. This capacitor is shown in detail in FIG. 9 and includes a composite plate formed by conductive half-plates 100 and 101, which when assembled to form the composite plate are separated by an insulating gap. A number of pairs of mica disk capacitors 106 and 107 are positioned in the half-plates. The capacitors in each pair are separated by a linen Bakelite insulating separator 108. The relative positions of the capacitors and separators are represented by an exploded view of one set of capacitors 106, 107 and separator 108. Screw 109 passes through annular conductive plate 110, insulation plate 111, makes contact with the center electrode of capacitor 106 and is stopped by separator 108, while screw 112 passes through annular conductive plate 113, insulation plate 117, makes contact with capacitor 107 and is stopped by the latter separator. The separators prevent contact between the screws which keeps the inductance shunting capacitors 103 to a minimum.

Conductive plate 110, insulation plate 111 and half-plates 100 and 101 form capacitors represented as 99A and 99A′ in FIG. 11. In a similar manner, the conductive plate 113, insulation plate 117, and the half-plates form capacitors 99 and 99′.

Insulating bushing 131, bolt 130 and other bushings and bolts (not shown) are used in the assembly of the ring-shaped capacitor. Each bushing passes through plates 110, 111, and either half-plate 100 or 101, and each bolt passes through a respective bushing and engages a threaded hole 132 in plate 113.

Contact ring 118 is positioned in groove 119 in ring 120. The latter ring is fastened to plates 30 and 113 by means of screws 121 (FIG. 2) and makes electrical contact with plate 30 via ring 118. Contact half-ring 123 is located between half-plates 22 and 100, while contact half-ring 124 is located between half-plates 21 and 101. Ring 118 and half-rings 123 and 124 are fabricated of RF braid. The composite plate formed by half-plates 21 and 22 is separated from plate 110 by a suitable gap, which serves as insulation. Likewise the plate formed by 100 and 101 is separated from plate 30 by an insulating gap. Various parts in FIG. 2 are fastened together by means of screws such as 121. Insulating bushings, such as 122, are used where appropriate to keep the inductance shunting capacitors in the figure to a minimum.

The sum of the capacity of capacitors 28 and 28′ and the sum of the capacity of capacitors 98 and 98′ (FIG. 10) are equal to approximately 2000 pf. The ring-shaped capacitor (FIG. 9) described above and represented as capacitors 99, 99′ and 99A, 99A′ in FIG. 11 increases this capacity to about 60,000 pf.

It will be understood that the embodiment in FIG. 2 may be used without the ring-shaped capacitor and that the embodiment in FIG. 1 may be used with the capacitor, depending upon the frequency of the standardizing current or voltage.

OPERATION

A typical operation of the arrangement in FIG. 1 is now presented with the assistance of FIG. 10. For the initial reading switch 61 is open and battery 126 drives bridge 53. Resistors 68, 69 are varied until a null is obtained on galvanometer 127, indicating the bridge is balanced. The voltage across resistor 128 ($V_{R1}$) is read then on voltmeter 129. Variable resistor 60 is adjusted to provide a desired level of RF; switch 61 is closed and the RF output of source 59 is applied in parallel across film resistors 62, 63. The bridge 53 is rebalanced by varying resistor 128; $V_{R2}$ appearing across 128 is read on meter 129.

The voltage, $V_{rf}$, applied to the voltmeter 50 being calibrated is given by $$V_{rf} = \frac{R_T}{2(R_T+R_B)}[(V_{R2}-V_{R1})(2V_o-V_{R2}-V_{R1})]^{1/2}$$

where:

$R_T$ = the resistance of 67 or the sum of the resistance of 62 and 63
$R_B$ = the resistance of 68 or 69
$V_o$ = voltage provided by battery 126
$V_{R1}$, $V_{R2}$ = voltages obtained across resistor 128 in operations described just above.

The following is a typical example of current standardization with the instrument in FIG. 2, presented with the assistance of the schematic and equivalent circuit in FIG. 11. With switches 94 and 134 open, the bridge 88 is balanced by varying resistors 136, 137 until a null is obtained on galvanometer 138. Resistors 136 and 137 are kept equal at bridge balance. The current $I_{dco}$ provided by constant current source 140 is then read on ammeter 139. When the bridge is balanced the current from source 140 is set and remains constant throughout the remainder of the measuring period. Switch 94 is then closed and variable resistors 92 is adjusted so that source 91 provides a desired level of RF current. The current flows through capacitor 93 and thermoelement 72 and then in parallel through resistors 62 and 63. Switch 134 is then closed and shunt resistor 146 is adjusted until bridge 88 is rebalanced and the current $I_s$ is read on ammeter 148. The value of the current $I_{rf}$ passing through the meter 75 to be calibrated is then determined from the equation $$I_{rf} = [2I_{dco}I_s - I_s^2]^{1/2}$$

where $I_{dco}$ and $I_s$ are the values of current determined in the measuring steps described just above.

Modifications

It will be understood that many variations and modifications of the present invention are possible in the light of the above teachings. Instead of bolometric film 12, for example, other types of thermistors or barretters may be used.

Again, each half of film 12 could comprise a thermocouple formed of alternate sections of two different metals, such as copper and constantan. In this arrangement the thermocouples would be calibrated with a low frequency, e.g., 60 Hz., voltage source using conventional techniques and a DC millivoltmeter would be used in place of circuit 53 in FIG. 1 or circuit 88 in FIG. 2. In another configuration, a number of thermocouples could be used, each comprising two dissimilar metals connected to an insulating bead. A thin conductive film would be deposited on substrate 10 in place of the two halves of bolometric film 12, and the thermocouples would have their beads mounted on the film. The thermocouples would be connected in series with a suitable millivoltmeter.

Again, instead of bolometric film 12 substrate 10 could be provided with a pair of luminescent film-elements, calibrated with a DC voltage source in accordance with conventional techniques. The luminescent film-elements would be energized with RF energy and the light emitted would be transmitted through a port in the coaxial assembly described above to a photoelectric amplifier. The output of the amplifier would be connected to an ammeter whose deflection would indicate the magnitude of the RF energy.

I claim:

1. In an electrical instrument, a coaxial assembly comprising:
   a center conductor,
   an outer conductor including a composite conductive annular plate positioned between a first and second outer conductive annular plate,
   said composite plate having a first and second section insulated from each other,
   first and second means for insulating said first and second outer plate, respectively, from said composite plate,
   an annular insulator disk having a substantially flat annular surface and inner and outer coaxial surfaces,
   said disk being positioned so that the plane of said annular surface is substantially transverse to the longitudinal axis of said center conductor,
   said annular surface having a first and second area separated by insulating means,
   a first and second electrothermic element, each including a thin-film element positioned in said first and second area, respectively,
   a first and second electrode positioned on the outer surface of said disk and insulated from each other,
   said first electrode being in contact with the first section of said composite plate and the thin-film element in the first area on said annular surface,
   said second electrode being in contact with the second section of said composite plate and the thin-film element in the second area on said annular surface,
   an inner electrode positioned on the inner coaxial surface of said disk,
   said center conductor being in contact with said inner electrode,
   first connector means for connecting a coaxial connector to said center conductor and said first outer plate, and
   second connector means for connecting another coaxial connector to said center conductor and said first outer plate, and
   second connector means for connecting another coaxial connector to the central conductor and the other outer plate.

2. The instrument set forth in claim 1 wherein:
   the plane of said annular surface is located substantially in the plane of the inner surface of said first insulating means.

3. The electrical instrument set forth in claim 1 wherein:
   the first and second area of said annular surface are substantially equal, and are each substantially equal to a half-circle.

4. The electrical instrument set forth in claim 3 including:
   a coaxial connector connected to said first connecting means and wherein:
      the sum of the radii of the first and second area is substantially equal to the inner diameter of said coaxial connector.

5. The instrument set forth in claim 1 wherein said center conductor comprises:
   a conductive pin having a bushing located between two male portions,
   said bushing being positioned in the hole of said disk and in contact with said inner electrode.

6. The instrument set forth in claim 1 wherein said center conductor comprises:
   a conductive pin having a bushing located between a male and a female portion,
   said bushing being positioned in the hole of said disk and in contact with said inner electrode.

7. The electrical instrument set forth in claim 1 including:
   a voltmeter connected to said first connector means,
   a variable radio frequency potential source connected to said second connector means, and
   a source of direct current biasing potential connected across the first and second section of said composite plate.

8. The electrical instrument set forth in claim 1 including:
   a current indicating device and a radio frequency current source connected in series to said first connector means,
   a high impedance device connected to said second connector means, and
   a source of direct current biasing potential connected across said first and second section of said composite plate.

9. The electrical instrument set forth in claim 1 including:
   capacitance means positioned across said first and second outer plates,
   said capacitance means comprising:
      an inner plate positioned between a pair of outer plates, and
      means for insulating said inner plate from said pair of outer plates.

10. The electrical instrument set forth in claim 8 including:
    at least one capacitor positioned in said inner plate.

References Cited

UNITED STATES PATENTS

| | | | |
|---|---|---|---|
| 2,921,262 | 1/1960 | Jaffe | 324—106 XR |
| 3,047,803 | 7/1962 | Sorger et al. | 324—106 |
| 3,098,984 | 7/1963 | Martin | 324—106 XR |
| 3,183,438 | 5/1965 | Hirsch | 324—106 |
| 3,200,331 | 8/1965 | Bloom et al. | 324—106 |
| 3,270,282 | 8/1966 | Weinschel | 324—106 |

RUDOLFH V. ROLINEC, Primary Examiner
ERNEST F. KARLSEN, Assistant Examiner

U.S. Cl. X.R.
324—106